(12) United States Patent
Imasaka et al.

(10) Patent No.: US 11,279,048 B2
(45) Date of Patent: Mar. 22, 2022

(54) LINEAR EXPANSION MECHANISM

(71) Applicant: FANUC CORPORATION, Yamanashi (JP)

(72) Inventors: Kousuke Imasaka, Yamanashi (JP); Kuniyasu Matsumoto, Yamanashi (JP); Wataru Amemiya, Yamanashi (JP); Moriaki Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/061,351

(22) Filed: Oct. 1, 2020

(65) Prior Publication Data
US 2021/0122066 A1    Apr. 29, 2021

(30) Foreign Application Priority Data
Oct. 23, 2019 (JP) .............................. JP2019-192804

(51) Int. Cl.
   *B25J 18/02* (2006.01)
(52) U.S. Cl.
   CPC .................................. *B25J 18/025* (2013.01)
(58) Field of Classification Search
   CPC . B25J 18/025; B25J 18/06; B25J 18/02; B25J 9/06
   See application file for complete search history.

(56) References Cited

U.S. PATENT DOCUMENTS

| | | | | |
|---|---|---|---|---|
| 2,574,657 A | * | 11/1951 | Pierce | B66F 3/06 254/1 |
| 5,970,701 A | * | 10/1999 | Roden | F16G 13/20 59/78 |
| 6,419,603 B1 | * | 7/2002 | Grasl | B66F 3/06 474/148 |
| 7,370,896 B2 | * | 5/2008 | Anderson | B25J 15/0009 294/106 |
| 7,621,078 B2 | * | 11/2009 | Phelan | B66F 13/005 52/121 |
| 8,925,405 B2 | * | 1/2015 | Kawabuchi | B25J 18/025 74/37 |
| 9,248,576 B2 | | 2/2016 | Yoon | |
| 10,335,943 B2 | * | 7/2019 | Yoon | B25J 9/047 |
| 10,406,697 B2 | * | 9/2019 | Yoon | F16G 13/20 |
| 10,670,113 B2 | * | 6/2020 | Yoon | F16H 19/0636 |
| 10,935,106 B2 | * | 3/2021 | Adams, Jr. | B66F 3/18 |
| 10,968,980 B2 | * | 4/2021 | Yoon | F16H 19/0663 |
| 2012/0024091 A1 | * | 2/2012 | Kawabuchi | B25J 18/06 74/37 |

FOREIGN PATENT DOCUMENTS

| | | |
|---|---|---|
| JP | 5435679 B2 | 3/2014 |
| JP | 2015-213974 A | 12/2015 |

* cited by examiner

*Primary Examiner* — David M Fenstermacher
(74) *Attorney, Agent, or Firm* — Nakanishi IP Associates, LLC

(57) ABSTRACT

A linear expansion mechanism includes: a plurality of linear-motion mechanisms assembled in series; a block train including a plurality of blocks coupled to each other in a row, a block at a leading end being connected to a linear-motion mechanism at a leading end; and a housing part that houses the block train. The housing part has a pair of arc-shaped rails and that being separately arranged on opposite sides of the block train, and a pair of projection bodies to be engaged with the pair of arc-shaped rails are provided on opposite side faces of each of the blocks.

9 Claims, 15 Drawing Sheets

LINEAR EXPANSION MECHANISM

CROSS-REFERENCE TO RELATED APPLICATIONS

This application is based upon and claims the benefit of priority from the Japanese Patent Application No. 2019-192804, filed Oct. 23, 2019 the entire contents of which are incorporated herein by reference.

FIELD

Embodiments described herein relate generally to a linear expansion mechanism.

BACKGROUND

As a linear expansion mechanism for a robot apparatus, a structure is known in which a first piece train including a plurality of first pieces (flat plates) coupled to each other by a rotating shaft in a bendable manner and a second piece train including a plurality of second pieces (blocks) similarly coupled to each other in a bendable manner are linked to each other to constitute a columnar arm unit, and the first piece train and the second piece train are separated from each other and housed as bendable columnar bodies in a vertical position in a strut unit (Patent Literature 1).

The linear expansion mechanism can extend the arm unit by increasing the numbers of the first and second pieces and is useful for applications in limited spaces since the arm unit does not protrude backward.

However, the structure requires two types of piece trains and therefore is complicated and inevitably heavy. In addition, the strength of the arm unit depends on the strength of the coupling between the pieces and the strength of the linkage between the two types of piece trains, so that there is a limit to the improvement of the strength of the arm unit.

Patent Literature 2 discloses a structure that uses a set of movable pieces to provide a linear expansion mechanism. The structure may be able to be simplified and reduced in weight because the structure requires only a set of movable pieces. However, the problem of the improvement of the strength of the arm unit remains unsolved because the arm unit is constituted by the set of movable pieces, which are coupled to each other by a rotating shaft, and thus the strength of the arm unit depends on the strength of the coupling. In addition, the set of movable pieces are bent in the rotation guide part, which has a substantially cylindrical shape and houses the set of movable pieces, and therefore may inhibit smooth expansion and contraction of the arm unit.

CITATION LIST

Patent Literature

Patent Literature 1: Japanese Patent No. 5435679
Patent Literature 2: Japanese Unexamined Patent Application Publication No. 2015-213974

SUMMARY OF INVENTION

Technical Problem

The linear expansion mechanism is required to be simplified in structure, reduced in weight and improved in strength of the arm unit and to achieve smooth expansion and contraction of the arm unit.

Solution to Problem

A linear expansion mechanism according to an aspect of the present disclosure includes: a plurality of linear-motion mechanisms assembled in series to each other; a block train including a plurality of blocks coupled to each other in a row, a block at a leading end of the plurality of blocks being connected to a linear-motion mechanism at a leading end of the plurality of linear-motion mechanisms; and a housing part that houses the block train, the housing part being connected to a linear-motion mechanism at a trailing end of the plurality of linear-motion mechanisms. The housing part has a pair of arc-shaped rails that allow the block train to move in an arc-shaped trajectory, the arc-shaped rails being separately arranged on opposite sides of the block train, and a pair of projection bodies to be engaged with the pair of arc-shaped rails are provided on opposite side faces of each of the blocks.

According to this aspect, the linear expansion mechanism is simplified in structure, reduced in weight and improved in strength of the arm unit and can achieve smooth expansion and contraction of the arm unit.

DETAILED DESCRIPTION

Figure 1:
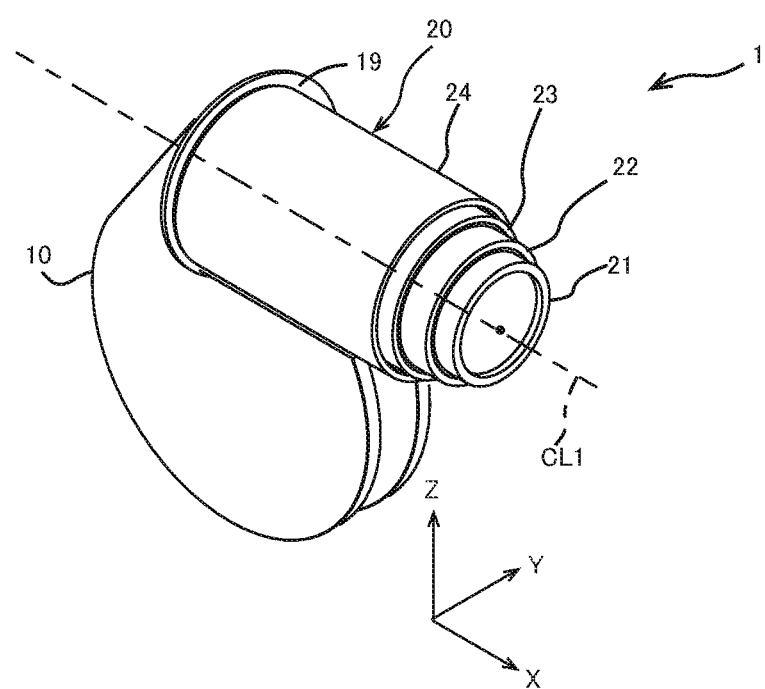
FIG. 1 is a perspective view of a linear expansion mechanism in a contracted state according to an embodiment.

In the following, a linear expansion mechanism according to an embodiment will be described with reference to the drawings. In the following description, components having substantially the same functions or configurations are denoted by the same reference numerals, and redundant descriptions thereof will be made only when needed. The linear expansion mechanism according to this embodiment can be used alone or as a linear expansion joint of a robot arm mechanism.

Figure 2:
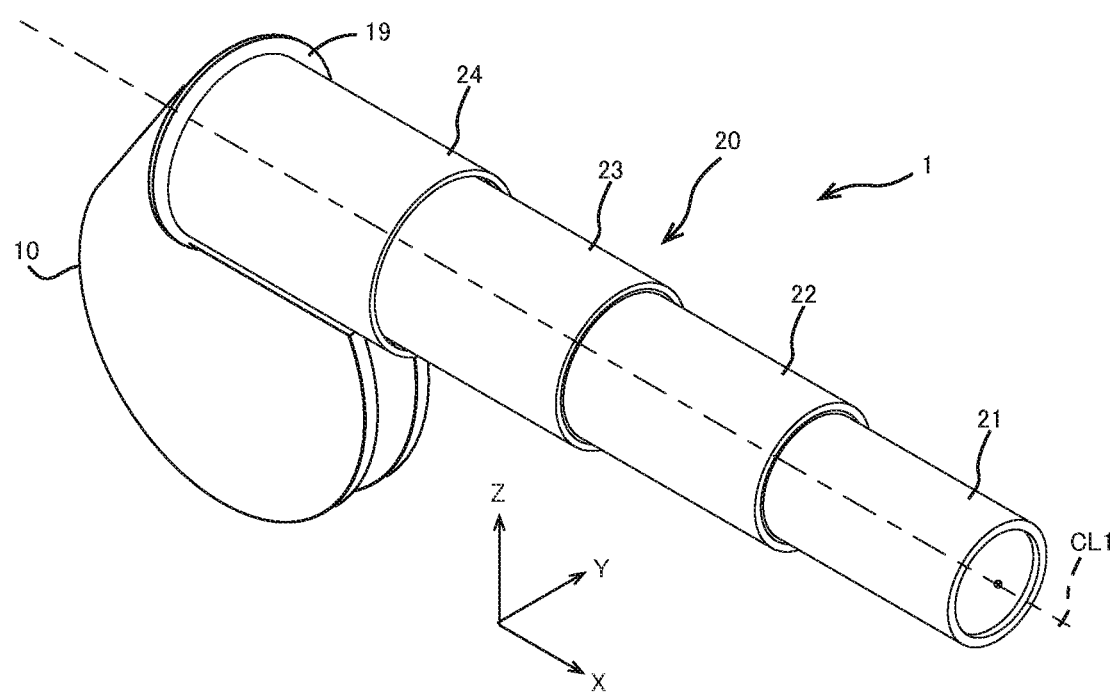
FIG. 2 is a perspective view of the linear expansion mechanism in an expanded state.

As shown in FIGS. 1 and 2, a linear expansion mechanism 1 has a retractable arm unit 20. Typically, the arm unit 20 includes a plurality of linear-motion mechanisms assembled in series to each other. In this embodiment, the arm unit 20 includes a plurality of, four in this embodiment, cylindrical bodies 21, 22, 23 and 24 assembled in a telescopic structure (a multi-level nested structure). The cylindrical bodies 21, 22, 23 and 24 typically have a circular cylindrical shape but may have a polygonal cylindrical shape.

Figure 3:
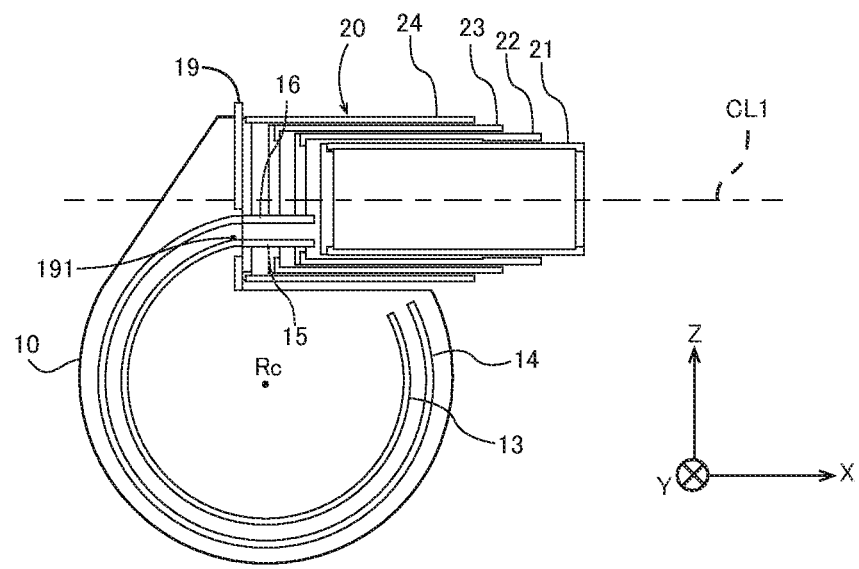
FIG. 3 is a side view showing the internal structure except a block train of the linear expansion mechanism in the contracted state.
Figure 4:
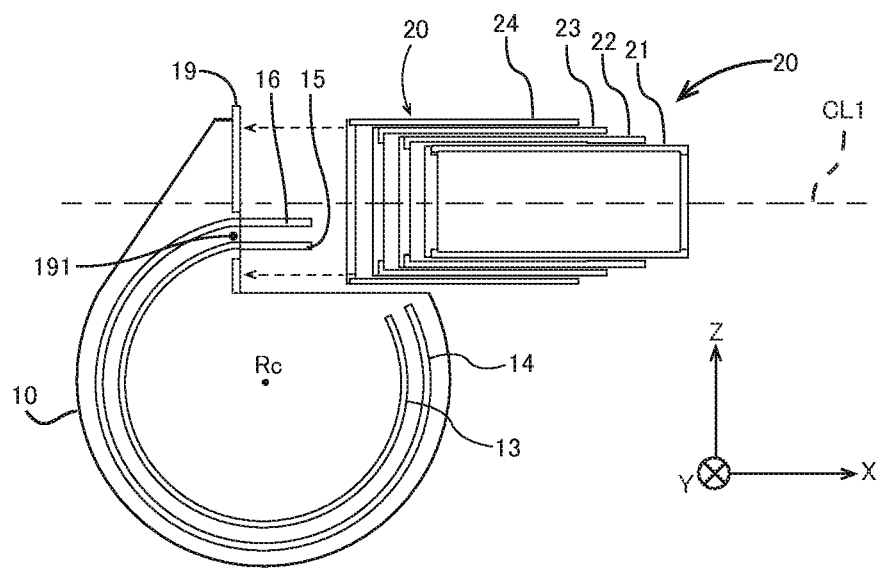
FIG. 4 is a side view of the linear expansion mechanism in FIG. 3, showing a housing and an arm unit separated from each other.

The arm unit 20 is supported by a housing 10. Typically, the housing 10 substantially has the shape of a short cylinder approximately an upper quadrant of which is cut away. As shown in FIGS. 3 and 4, the cut upper part of the housing 10 is closed by a lid plate 19. A rear end of the arm unit 20 or, in other words, a cylindrical body 24 at the trailing end of the arm unit 20 is perpendicularly fixed to the lid plate 19 at a flange thereof. The lid plate 19 to which the cylindrical body 24 at the trailing end is fixed has an opening 191 formed therein. Through the opening 191, the interior of the housing 10 and the hollow interiors of the cylindrical bodies 21, 22, 23 and 24 are in communication with each other. The opening 191 serves as an access hole through which a block train 30 described later is inserted into and pulled out of the housing 10.

Figure 5:
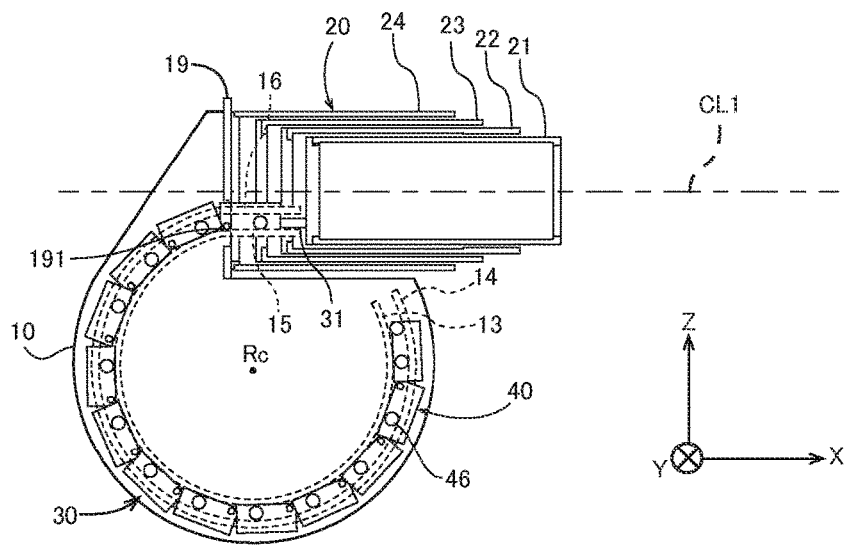
FIG. 5 is a side view showing the internal structure of the linear expansion mechanism in the contracted state.
Figure 6:
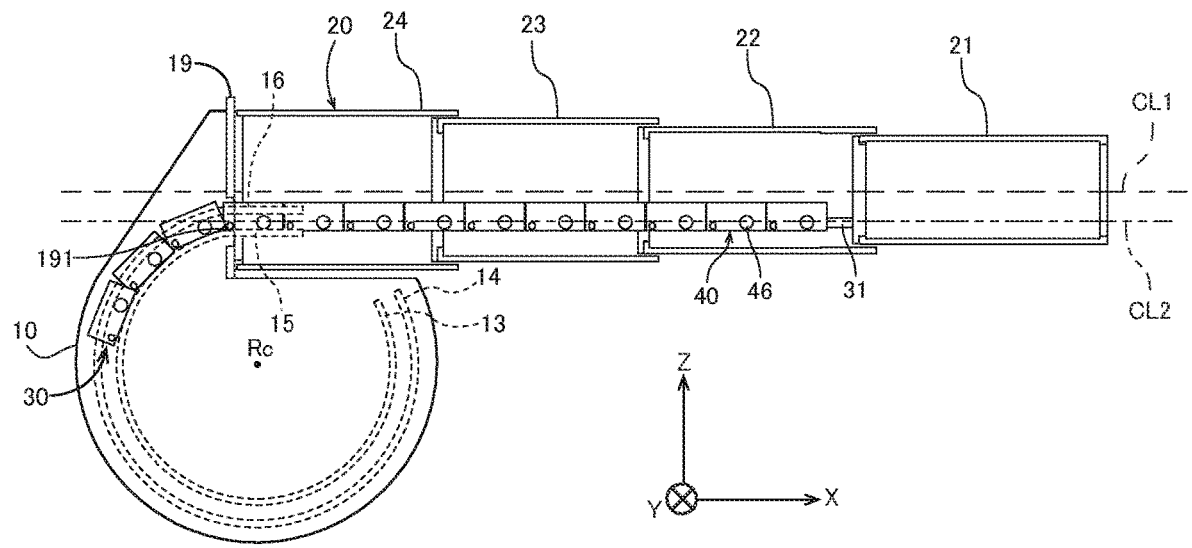
FIG. 6 is a side view showing the internal structure of the linear expansion mechanism in the expanded state.

As shown in FIGS. 5 and 6, the block train 30 is inserted in the interior space formed by the interior of the housing 10 and the hollow interiors of the cylindrical bodies 21, 22, 23 and 24 that are in communication with each other. The block train 30 is constituted by a plurality of blocks 40 coupled to each other in a row. The block 40 at the leading and of the block train 30 is connected to the cylindrical body 21 at the leading end of the plurality of cylindrical bodies 21, 22, 23 and 24 by a connector piece 31. The block 40 at the leading end is connected to a part of the cylindrical body 21 at the leading end where the block train 30 delivered from a housing part of the housing 10 can linearly move along a straight trajectory CL2 (axis of movement CL2) that is parallel to a cylinder centerline CL1. The opening 191 described above is positioned so that the axis of movement CL2 intersects with the plane of the opening.

The housing part of the housing 10 is provided in the housing 10, and the housing part houses the block train 30 extending along an arc-shaped trajectory centered about a housing center Rc. The housing part will be described in detail later. In the state where the arm unit 20 is retracted, almost the whole of the block train 30 is housed in the housing part in the housing 10. In the housing 10, a drive mechanism is provided that achieves a delivery operation and a retraction operation for the block train 30. The drive mechanism can be any mechanism, such as a rack and pinion mechanism or a ball screw mechanism. Of course, the drive mechanism can also be provided outside the housing 10.

A basic expansion and contraction operation of the linear expansion mechanism 1 is as follows.

The block train 30 housed in the housing 10 is delivered into the arm unit 20 through the opening 191 by the drive mechanism, and the block 40 at the leading end moves forward along the axis of movement CL2. Since the block 40 at the leading end is connected to the cylindrical body 21 at the leading end, as the block 40 at the leading end moves forward, the cylindrical bodies 21, 22 and 23 are sequentially pushed out of the cylindrical body 24 at the trailing end, which is fixed to the housing 10. In this way, the arm unit 20 expands forward along the cylinder centerline CL1.

As the drive mechanism retracts the block train 30 delivered into the arm unit 20 back into the housing 10 through the opening 191, the block 40 at the leading end moves backward along the axis of movement CL2. As the block 40 at the leading end moves backward, the cylindrical body 21 at the leading end is retracted into the cylindrical body at the rear thereof, which is also retracted into the cylindrical body at the rear thereof, and so on. In this way, the arm unit 20 contracts backward along the cylinder centerline CL1.

As described above, the block train 30 constitutes a part of an actuator that causes expansion and contraction of the arm unit 20. Since the arm unit 20 is constituted by the plurality of cylindrical bodies 21, 22, 23 and 24 assembled in a multi-level nested structure, and the actuator for expanding and contracting the arm unit 20 is constituted by the single block train 30, the structure is simplified, the weight is reduced, and the strength of the arm unit 20 is improved by the cooperation of the multi-level nested structure and the block train.

Figure 7:
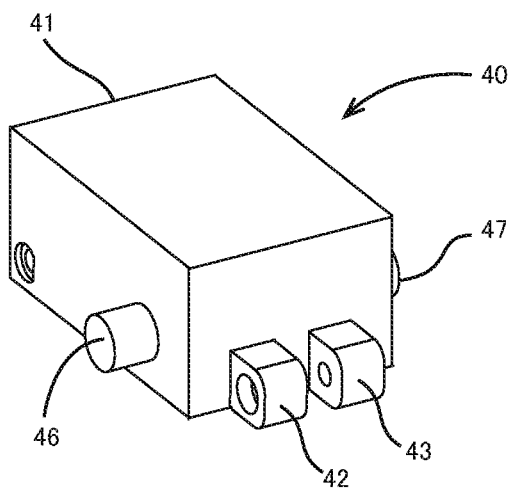
FIG. 7 is a front perspective view of a block in FIG. 5.
Figure 8:
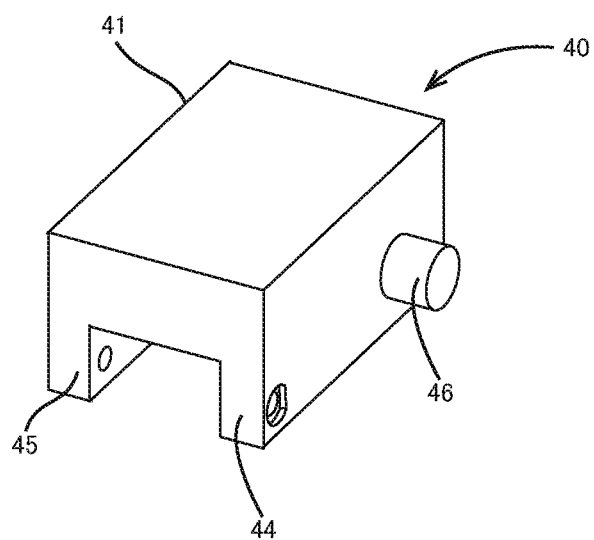
FIG. 8 is a rear perspective view of the block in FIG. 5.
Figure 9:
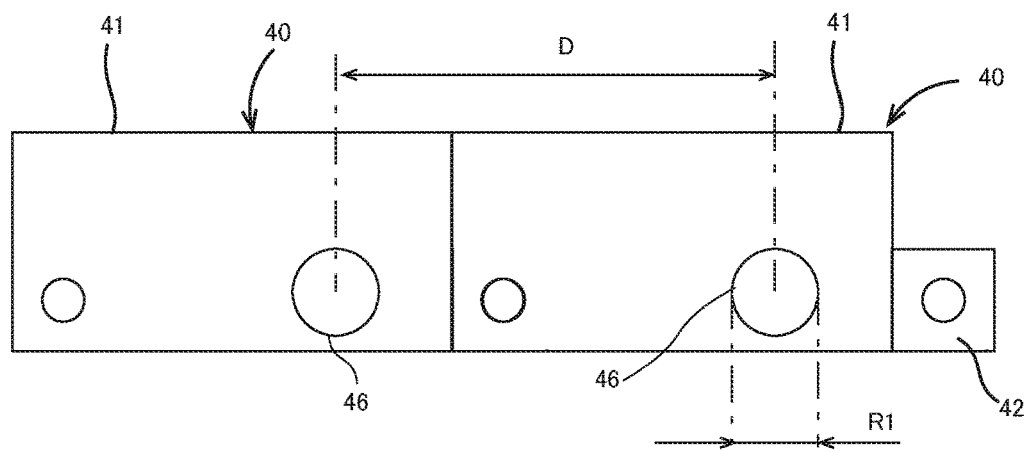
FIG. 9 is a side view of the blocks in FIG. 5.

As shown in FIGS. 7 and 8, the block 40 has a block main body 41. The block main body 41 has the shape of a rectangular parallelepiped, for example. The block main body 41 has two bearings 42 and 43 provided to protrude forward in a lower part of the front end thereof in such a manner that the bearings 42 and 43 are spaced apart from each other in the width direction of the block main body 41. The block main body 41 has bearings 44 and 45 provided integrally with the block main body 41 in a lower part of the rear end thereof in such a manner that the bearings 44 and 45 are spaced apart from each other in the width direction of the block main body 41. The bearings 42 and 43 on the front end of one of two adjacent blocks 40 are fitted into the space between the bearings 44 and 45 on the rear end of the other of the two adjacent blocks 40, and a rotating shaft (not shown) is inserted into the holes of the bearings. In this way, the blocks 40 are rotatably coupled to each other in a row. The blocks 40 are coupled to each other in a row in the direction (direction of coupling) perpendicular to the rotating shaft. As shown in FIG. 9, since the bearings 42, 43, 44 and 45 are provided closer to the bottom of the block main body 41, and the block main bodies 41 have the shape of a rectangular parallelepiped, adjacent two blocks 40 once arranged in a straight line abut against each other at the end faces thereof, and therefore, the blocks 40 are prevented from further rotating upward, although the blocks 40 can rotate downward.

The block main body 41 has a pair of projection bodies 46 and 47, which are to be engaged with a pair of arc-shaped rails 13 and 14 described later, one on each side face thereof. Typically, the projection bodies 46 and 47 can be cam followers that can roll on the pair of arc-shaped rails 13 and 14. The cam followers are attached to the block main body 41 in such a manner that the axis of rotation of the outer ring of each cam follower is parallel to and the same as the rotating shaft of the block 40. The projection bodies 46 and 47 may be simple projections having a cylindrical or other shape. However, the description herein is made on the assumption that the projection bodies 46 and 47 are cam followers.

Figure 10:
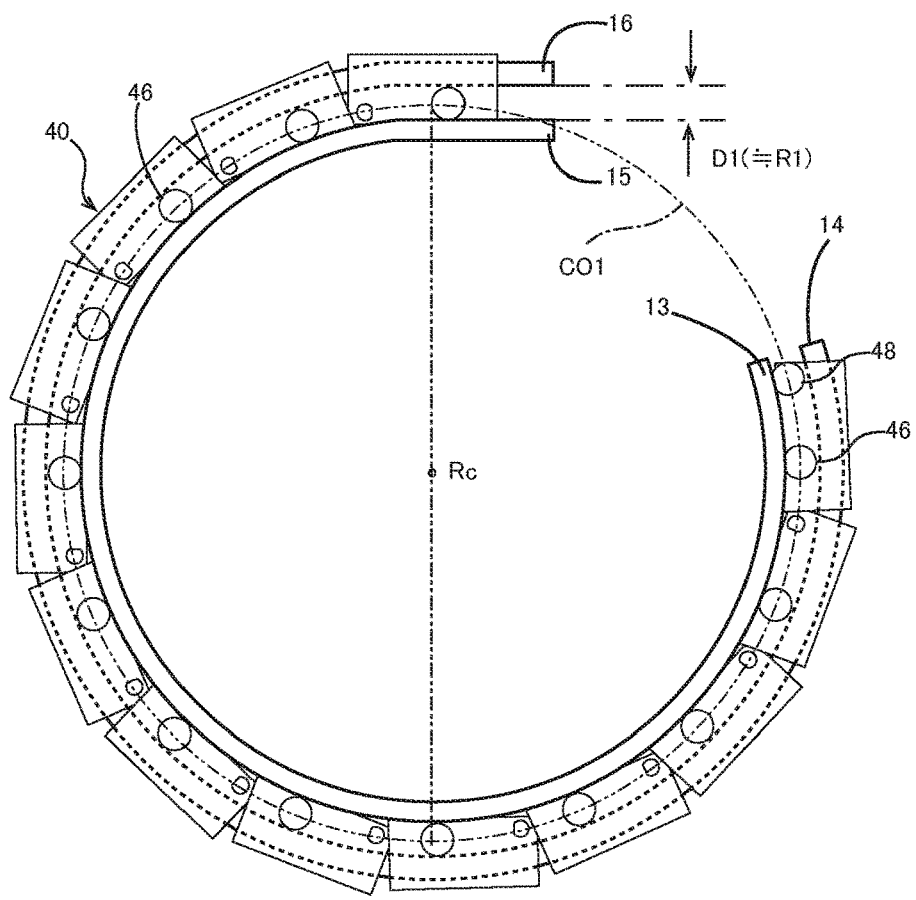
FIG. 10 is a side view showing a pair of rails provided in a housing along with the blocks.

As shown in FIG. 10, in order that the block train 30 can smoothly move along an arc-shaped trajectory, the cam followers 46 and 47 are positioned with respect to the block main body 41 in such a manner that the axis of rotation of the outer ring of the cam follower 46 (47) is located on a circle CO1 that is concentric with an arc-shaped trajectory (arc-shaped rails 13 and 14 described later) centered about the housing center Rc along with the rotating shafts coupling the blocks 40 to each other, when viewed in side view. As a result, the block train 30 is housed along the arc-shaped trajectory in the housing 10 under the constraint of the arc-shaped rails 13 and 14.

The rails 13 and 14 constrains only the cam followers 46 and 47 of the block 40. The cam followers 46 and 47 are coaxially attached to the block main body 41 one on each side face thereof, so that the block 40 can slightly rotate about the cam followers 46 and 47. Therefore, the block train 30 may be bent in the housing part and therefore be unable to smoothly move.

Figure 11:
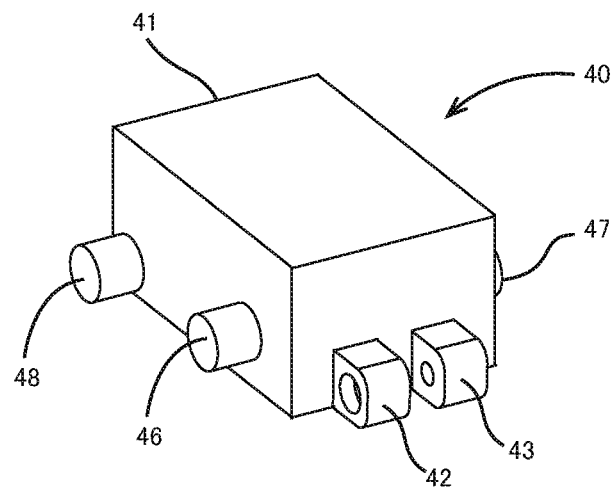
FIG. 11 is a front perspective view of the block at the trailing end of a block train in FIG. 10.
Figure 12:
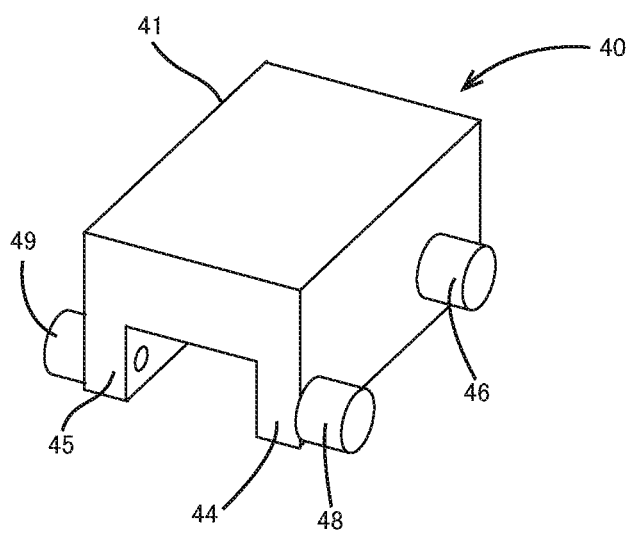
FIG. 12 is a rear perspective view of the block at the trailing end in FIG. 11.

To avoid this, according to this embodiment, as shown in FIGS. 11 and 12, the block main body 41 of the block 40 at the trailing end of the block train 30 has two cam followers 46 and 48 on one side face thereof and two cam followers 47 and 49 on the other side face thereof. The two cam followers on each side face of the block main body 41 are positioned with respect to the block main body 41 in such a manner that the cam followers are located on the circle CO1. Since the block main body 41 has two cam followers on each side face thereof, the posture of the block 40 at the trailing end is fixed along the rails 13 and 14. The block 40 adjacent to the block 40 at the trailing end is constrained at two parts thereof by the cam followers 46 and 47 of itself and the rotating shaft coupling the block 40 to the block 40 at the trailing end, so that the posture of the block 40 is fixed along the rails 13 and 14, as with the block 40 at the trailing end. The other blocks 40 located toward the front are also each constrained at two parts thereof by the cam followers 46 and 47 of itself and the rotating shaft coupling the block 40 to the following block 40, so that the posture thereof is fixed along the rails 13 and 14. In this way, the postures of all the blocks 40 are adjusted to be the same as the posture of the block 40 at the trailing end in a cascade manner. Therefore, the block train 30 is not bent in the housing part and can smoothly move in a fixed posture along the arc-shaped trajectory.

The projection bodies to be engaged with the rails 13 and 14 are not limited to the cam followers, as far as they ensure that the blocks 40 can move along the rails 13 and 14. The projection body may be a rolling body that rolls on the surface of the rail or a sliding body that slides on the surface of the rail, as appropriate. The rolling body may be any of various bearings, such as those having a cylindrical shape, a needle-like shape, a rod-like shape, a conical shape and a spherical shape. The sliding body may be a cylindrical body or a rod-shaped body at least a face of which that is to come into contact with the rail 13 or 14 is made of a self-lubricating resin material.

The block 40 having two cam followers on each side face thereof may not be the block 40 at the trailing end but may be any of the blocks 40 that is located in the housing 10 (within the rails 13 and 14) when the arm unit 20 expands to the maximum. Alternatively, all the blocks 40 may have two cam followers on each side face thereof, or every several blocks 40 may have two cam followers on each side face thereof. Furthermore, instead of attaching two cam followers to each side face of the block 40 at the trailing end, the block 40 may be provided with one cam follower 46 on one side face thereof and one cam follower 47 on the other side face thereof with the axes of rotation thereof being shifted in the longitudinal direction, thereby fixing the posture of the block 40 along the rails 13 and 14.

Figure 13:
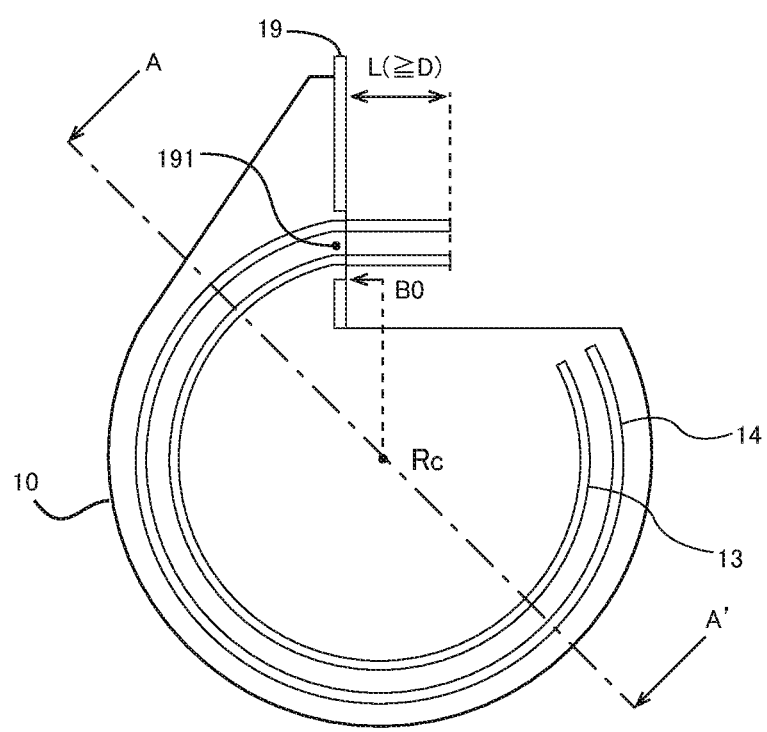
FIG. 13 is a side view of the rails in FIG. 10.
Figure 14:
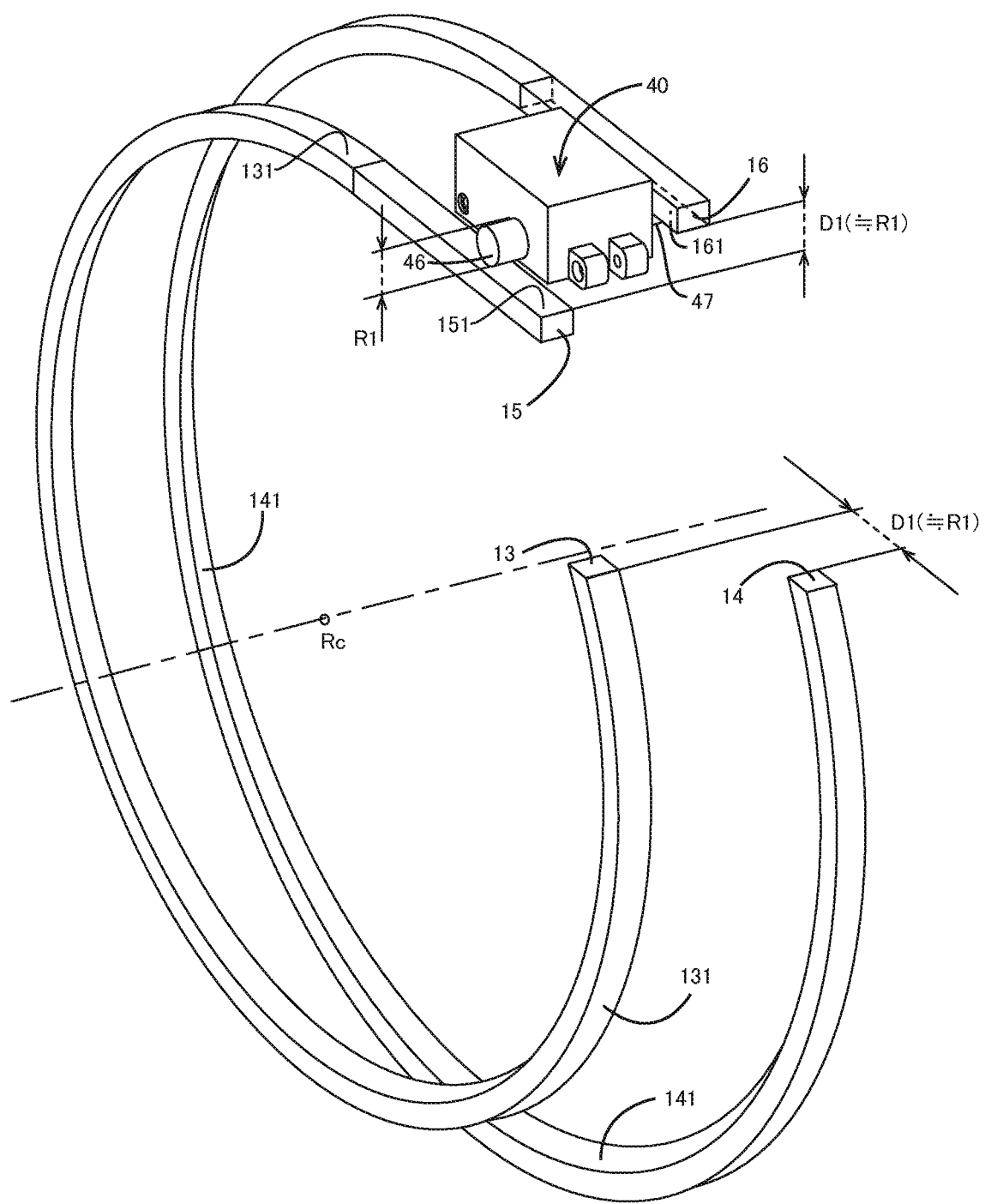
FIG. 14 is a perspective view of the rails in FIG. 10.

As shown in FIGS. 13 and 14, in order to smoothly house the block train 30 along the arc-shaped trajectory, the housing part has the pair of arc-shaped rails 13 and 14 that guide the cam followers 46 and 47 attached to the block 40. The arc-shaped rails 13 and 13 have different radii and are arranged about the same arc center Rc so that the arc-shaped rails 13 and 14 independently guide the cam followers 46 and 47 from inside and outside, respectively. To prevent the cam followers 46 and 47 from reversely rotating against the direction of movement, the arc-shaped rails 13 and 14 are separately arranged on the opposite sides of the block train 30 and spaced apart from each other at a distance slightly greater than the width of the block 40 in the direction of the centerline of the housing 10. This arrangement will be described in detail below. In FIG. 14, reference numerals 131 and 141 denote guide faces of the pair of arc-shaped rails 13 and 14 on which the outer rings of the cam followers 46 and 47 roll. The radii of the pair of arc-shaped rails 13 and 14 are set in such a manner that the guide faces 131 and 141 are spaced apart from each other in side view at a distance slightly greater than a diameter R1 (see FIG. 9) of the cam followers 46 and 47 over the entire areas thereof. In other words, the radii of the guide faces 131 and 141 of the cam followers 46 and 47 differ from each other by a distance slightly greater than the diameter R1 of the cam followers 46 and 47. One arc-shaped rail 13 serves as an inner rail 13 that has a shorter radius than the other, guides the cam follower 46 on one side face of the block 40 from inside and defines the trajectory of the block train 30 from inside. The other arc-shaped rail 14 serves as an outer rail 14 that has a longer radius than the inner rail 13, guides the cam follower 47 on the other side face of the block 40 from outside and defines the trajectory of the block train 30 from outside.

The block 40 is constrained by rails 101 and 102 at the side faces thereof as described later, and the block train 30 is deformed into an arc-shaped trajectory, the block train 30 is prevented from rotating about the axis thereof and therefore does not come off the pair of arc-shaped rails 13 and 14.

The outer ring of the cam follower 46 on one side face of the block 40 rolls only on the outer guide face 131 of the inner rail 13, and the outer ring of the cam follower 47 on the opposite side of the block 40 rolls only on the inner guide face 141 of the outer rail 14. That is, the outer rings of the cam followers 46 and 47 on the opposite sides rotate in the opposite directions with respect to the guide faces 131 and 141, respectively, although both the outer rings rotate in the forward direction with respect to the direction of movement of the block train 30. If the block train 30 moves with the cam follower on one side face of the block 40 being held between the inner rail and the outer rail, the outer ring of the cam follower rotates in the forward direction with respect to one of the rails, whereas the outer ring of the cam follower rotates in the opposite direction with respect to the other rail to inhibit the movement of the block train, and therefore the block train 30 cannot smoothly move. According to this embodiment, the inner rail 13 and the outer rail 14 are separately arranged on the opposite sides of the block train 30, and each of the outer rings of the cam followers 46 and 47 on the opposite sides rolls only on one of the inner rail 13 and the outer rail 14, so that the cam followers 46 and 47 do not rotate in the direction to inhibit the movement of the block train 30. Therefore, the block train 30 can be smoothly delivered and retracted along the arc-shaped trajectory, and thus the arm unit 20 can also be smoothly expanded and contracted.

As shown in FIG. 13, the arc-shaped rails 13 and 14 typically have a length equivalent to three quarters of the circumference of the circle. The circumferential length of the arc-shaped rails 13 and 14 is preferably reduced by a length equivalent to 5 to 15 degrees, more preferably by a length equivalent to 8 degrees. If the length of the arc-shaped rails 13 and 14 is reduced as described above, the lid plate 19 of the housing 10 is also retracted by a tangential distance B0, which is equivalent to 8 degrees by which the length of the arc-shaped rails 13 and 14 is reduced, with the orientation being kept parallel to the radius or, in other words, perpendicular to the cylinder center line CL1. Since the rear end of the arm unit 20 is fixed to the lid plate 19, the movable portion of the arm can be slightly brought closer to the housing 10, and accordingly, the access to the base of the arm is improved.

Since the arm unit 20 is perpendicularly attached to the lid plate 19 that is parallel to the radius, and the circumferential length of the arc-shaped rails 13 and 14 is reduced by a length equivalent to 8 degrees, the tangent to the arc-shaped rails 13 and 14 at the leading ends thereof and the cylinder centerline CL1 are not parallel to each other and slightly intersect with each other. Therefore, when the block train 30 is delivered, the trajectory slightly but discontinuously changes direction at the point where the trajectory shifts from the arc-shaped trajectory to the straight trajectory. Similarly, when the block train 30 is retracted into the housing part, the trajectory of the block train 30 discontinuously changes direction. The discontinuous change in direction may cause a vertical rattling or a gentle curvature of the block train 30. To minimize such a rattling or curvature of the block train 30, straight rails 15 and 16 are spliced to the leading ends of the arc-shaped rails 13 and 14. As shown in FIGS. 13 and 14, the straight rail 15 extends from the leading end of the arc-shaped rail 13 in parallel to the cylinder centerline CL1. Similarly, the straight rail 16 extends from the leading end of the arc-shaped rail 14 in parallel to the cylinder centerline CL1. In order that the vertical and horizontal distances between the pair of straight rails 15 and 16 are the same as the vertical and horizontal distances between the leading ends of the pair of arc-shaped rails 13 and 14, guide faces 151 and 161 of the pair of straight rails 15 and 16 are spaced apart from each other in side view by a distance D1, which is substantially equal to the diameter R1 of the cam followers 46 and 47, over the entire areas thereof.

As shown in FIG. 13, the straight rails 15 and 16 have a length L that is equal to a distance D between the axes of rotation of the cam followers 47 of two adjacent blocks 40. When the block train 30 is delivered from the arc-shaped rails 13 and 14 or retracted onto the arc-shaped rails 13 and 14, the straight rails 15 and 16 always constrain only the cam followers 46 and 47 of one block 40. That is, when the cam followers 46 and 47 of one block 40 leave the straight rails 15 and 16, the cam followers 46 and 47 of the adjacent block 40 are introduced onto the straight rails 15 and 16. Since the straight rails 15 and 16 always constrain only the cam followers 46 and 47 of one block 40, when that block 40 and the adjacent block 40 pass through the joint between the arc-shaped rails 13 and 14 and the straight rails 15 and 16, the relative positions thereof change, but the change always occurs in the same way. In other words, the block train 30 always passes through the joint between the arc-shaped rails 13 and 14 and the straight rails 15 and 16 in the same trajectory. Therefore, the positional precision can be ensured. Although the straight rails 15 and 16 can have any length equal to or greater than the distance D between the axes of rotation of two adjacent cam followers 46 or 47, the length is preferably equal to the distance D between the axes of rotation from the viewpoint of weight reduction and ease of rotation.

Figure 15:
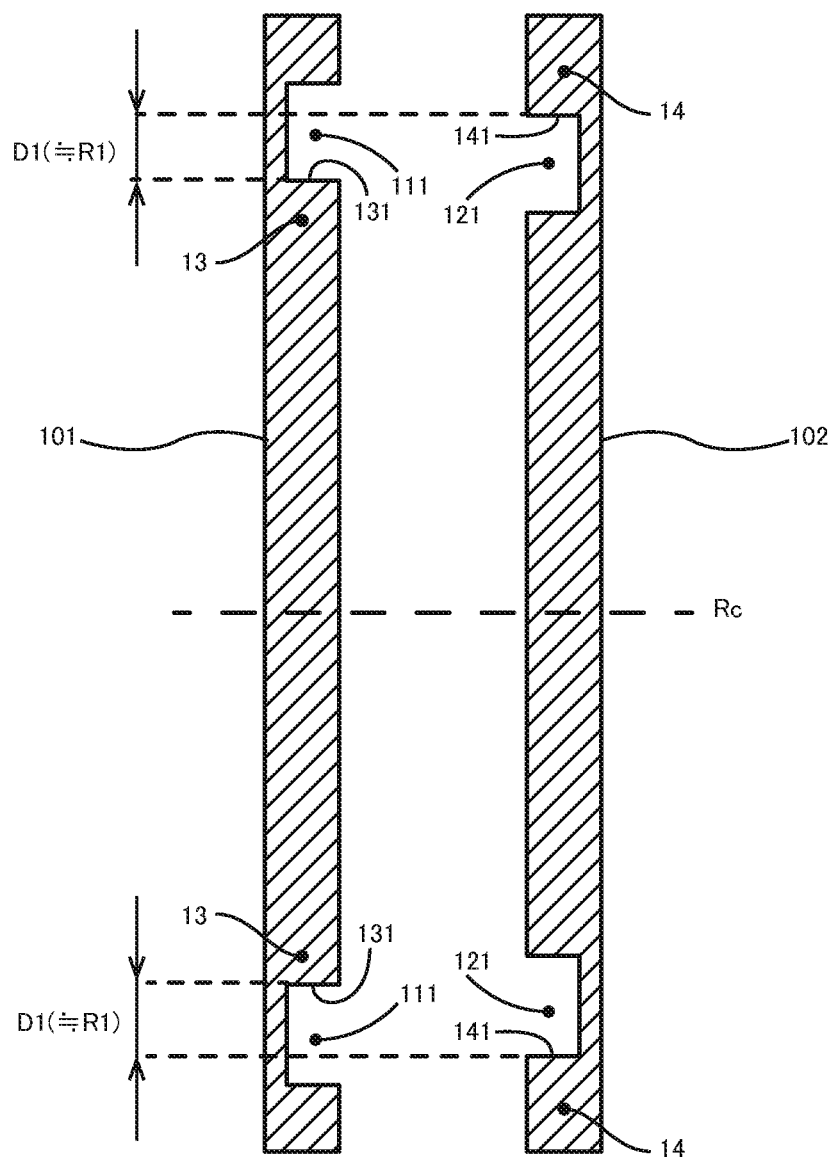
FIG. 15 is a cross-sectional view taken along the line A-A' in FIG. 13.

The arc-shaped rails 13 and 14 are configured as a part of a torus. However, from the viewpoint of efficiency of manufacture, the arc-shaped rails 13 and 14 are preferably formed by forming arc-shaped grooves 111 and 121 in disk-shaped rail plates 101 and 102 having a fixed thickness. As shown in FIG. 15, the disk-shaped rail plates 101 and 102 are arranged parallel to each other at such a distance that the distance between the bottoms of the pair of grooves 111 and 121 is slightly greater than the overall width of the pair of cam followers 46 and 47. The depth of the pair of grooves 111 and 121 is equal to the overall length (height) of the outer rings of the cam followers 46 and 47. The width of the pair of grooves 111 and 121 is sufficiently greater than the diameter of the outer rings of the cam followers 46 and 47.

An arc-shaped groove having a greater diameter (outer groove 111) is formed in one disk-shaped rail plate 101, and an arc-shaped groove having a smaller diameter (inner groove 121) concentric with the outer groove 111 is formed in the other disk-shaped rail plate 102. In side view, the outer groove 111 and the inner groove 121 overlap with each other in the width direction thereof by a distance that is slightly greater than the diameter R1 of the cam followers 46 and 47.

Figure 16:
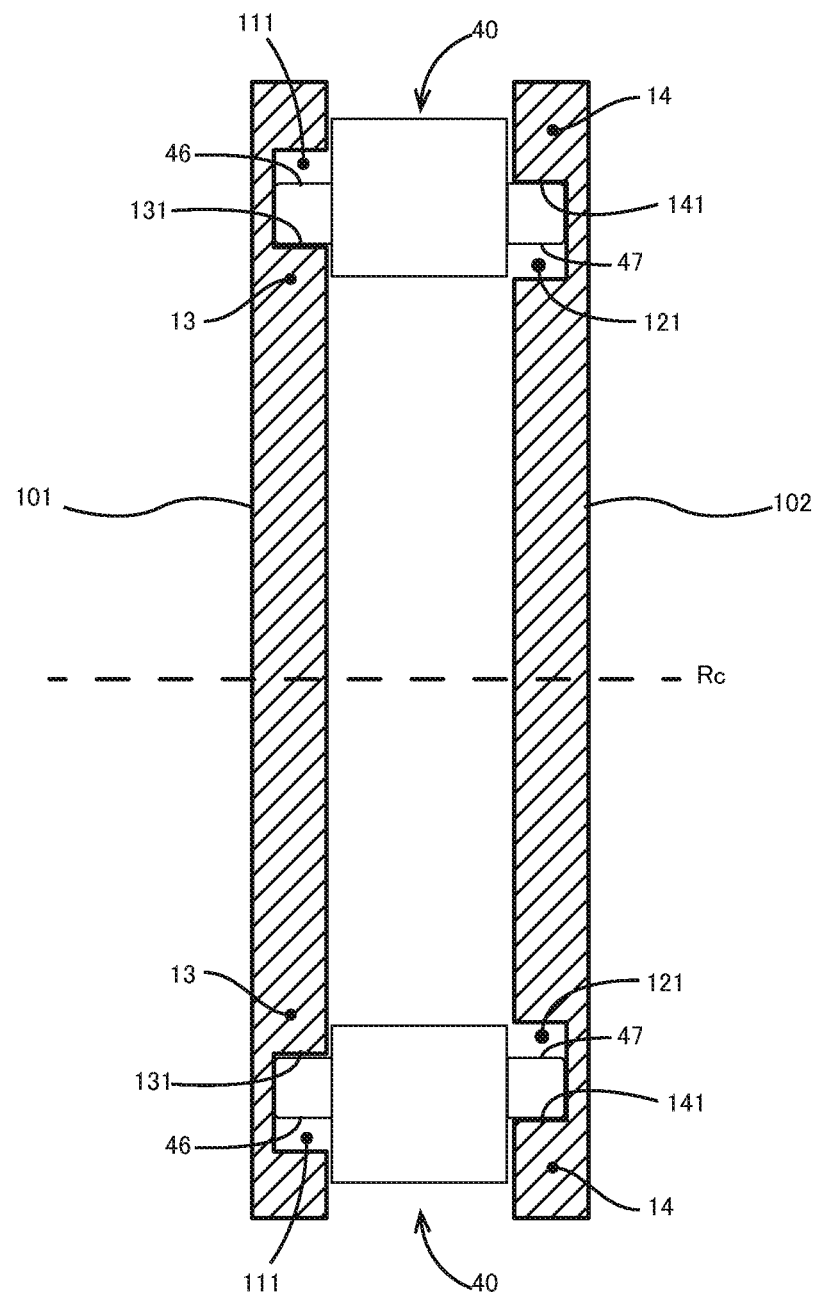
FIG. 16 is a cross-sectional view showing rails in FIG. 15 along with the blocks.

As shown in FIG. 16, an inner wall (guide face) of the groove 111 of the rail plate 101 having the greater radius serves as a guide face 131 on which the outer ring of the cam follower 46 on one side face of the block 40 rolls. An outer wall (guide face) 141 of the groove 121 of the rail plate 102 having the smaller radius serves as a guide face 141 on which the outer ring of the cam follower 47 on the opposite side of the block 40 rolls. That is, the inner side face of the outer groove 111 serves as the guide face 131 of the inner rail 13 that guides the cam follower 46 on one side face of the block 40 from inside and defines the trajectory of the block train 30 from inside, and the inner part of the disk-shaped rail plate 61 including the inner side face of the outer groove 111 serves as the inner rail 13 described above. Similarly, the outer side face of the inner groove 121 serves as the guide face 141 of the outer rail 14 that guides the cam follower 47 on the opposite side of the block 40 from outside and defines the trajectory of the block train 30 from outside, and the outer part of the disk-shaped rail plate 62 including the outer side face of the inner groove 121 serves as the outer rail 14 described above.

Figure 17:
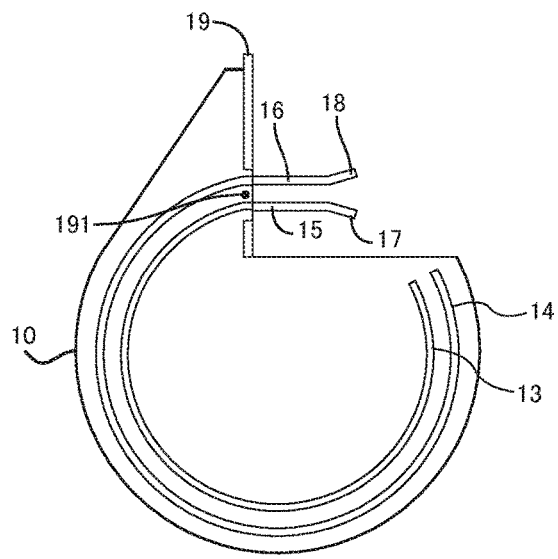
FIG. 17 is a side view showing a modification of the rails in FIG. 12.

As shown in FIG. 17, to guide the block train 30 onto the straight rails 15 and 16, a pair of auxiliary rails 17 and 18 that expand in a reverse tapered shape along the forward direction may be connected to the leading ends of the straight rails 15 and 16.

Figure 18:
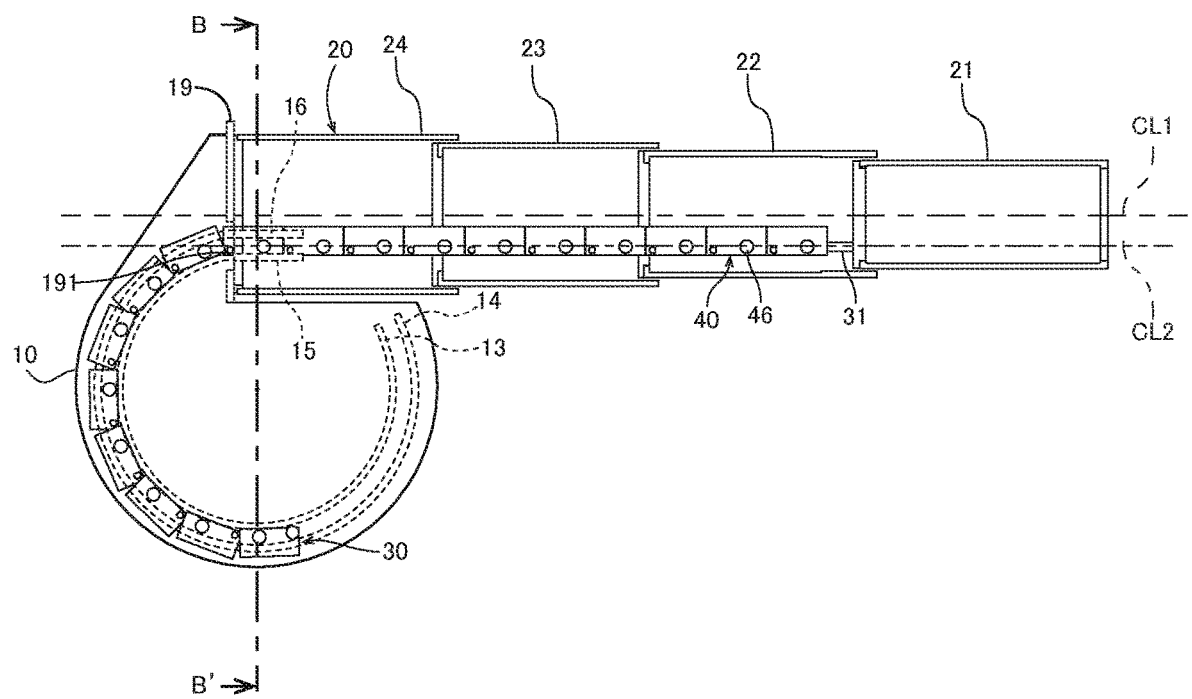
FIG. 18 is a side view showing a modification of the block train constituting the linear expansion mechanism in FIG. 1 along with the arm unit in the expanded state.

As shown in FIG. 18, the block train 30 preferably has such an overall length that the block train 30 circumferentially extends over at least a half of the housing part when the block train 30 is delivered over the furthest distance to expand the arm unit 20 to the maximum. This ensures that even if an external force about the cylinder centerline CL1, that is, an external torsional force is exerted on the arm unit, the external force is transmitted from the block 40 at the leading end connected to the arm unit 20 to the entire block train 30 in a cascade manner. In order to reduce the torsional error of the arm unit 20, the rigidity of the arm unit 20, the rigidity of the linear expansion mechanism 1, and the support rigidity thereof need to be improved, of course. According to this embodiment, however, the block train 30 has an overall length enough for the block train 30 remaining in the housing part to extend over at least a half of the circumference of the housing part as described above, which is a requirement for effectively reducing the torsional error.

Figure 19:
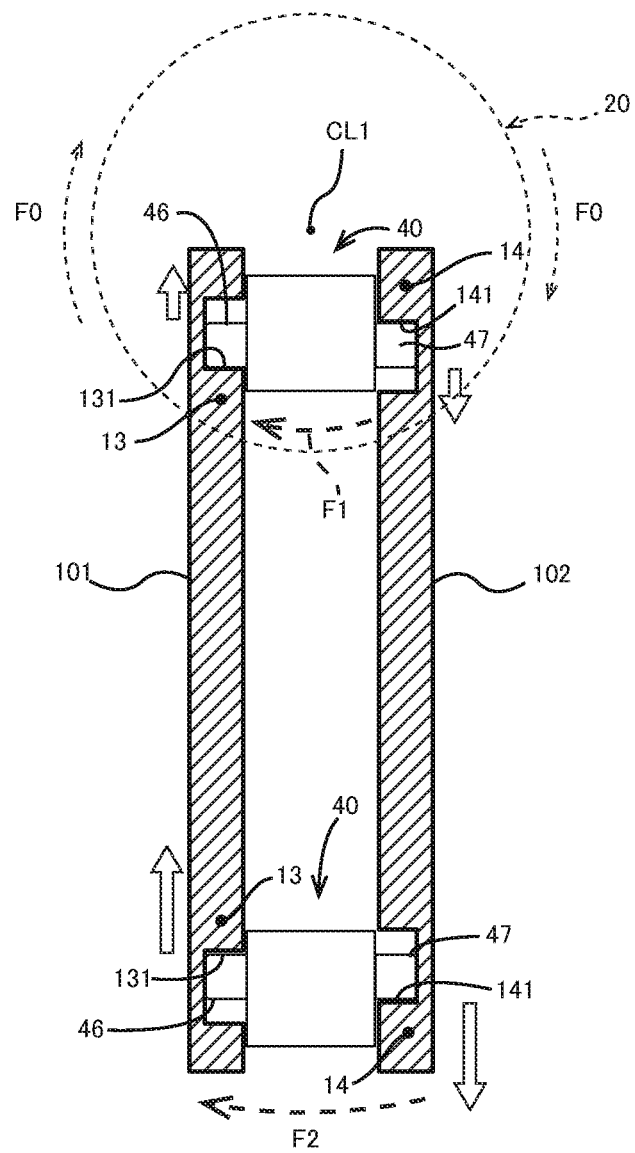
FIG. 19 is a cross-sectional view taken along the line B-B' in FIG. 18.

This will be described in more detail. As shown in FIG. 19, when an external force F0 is exerted to the arm unit 20 in the clockwise direction in the sheet of the drawing about the cylinder centerline CL1, for example, the external force F0 is exerted as forces F1 and F2 on the block train 30. The external force F1 acting on a block 40 closer to the opening 191 is exerted in the direction to separate the cam followers 46 and 47 from the guide faces 131 and 141 of the arc-shaped rails 13 and 14, respectively. However, the external force F2 acting on a block 40 remaining below the upper block 40 is exerted in the direction to press the cam followers 46 and 47 against the guide faces 131 and 141 of the arc-shaped rails 13 and 14, respectively. Therefore, not only when the arm unit 20 is not fully expanded but also the arm unit 20 is expanded to the maximum, the block train 30 can effectively help preventing a twisting of the arm unit 20 in cooperation with the rails 13 and 14. On the other hand, when the external force F0 is exerted to the arm unit 20 in the counterclockwise direction in the sheet of the drawing, the external force F2 acting on a lower block 40 is exerted in the direction to separate the cam followers 46 and 47 from the guide faces 131 and 141 of the arc-shaped rails 13 and 14, respectively, whereas the external force F1 acting on an upper block 40 is exerted in the direction to press the cam followers 46 and 47 against the guide faces 131 and 141 of the arc-shaped rails 13 and 14, respectively. In this case, again, the block train 30 can help preventing a twisting of the arm unit 20.

Figure 20:
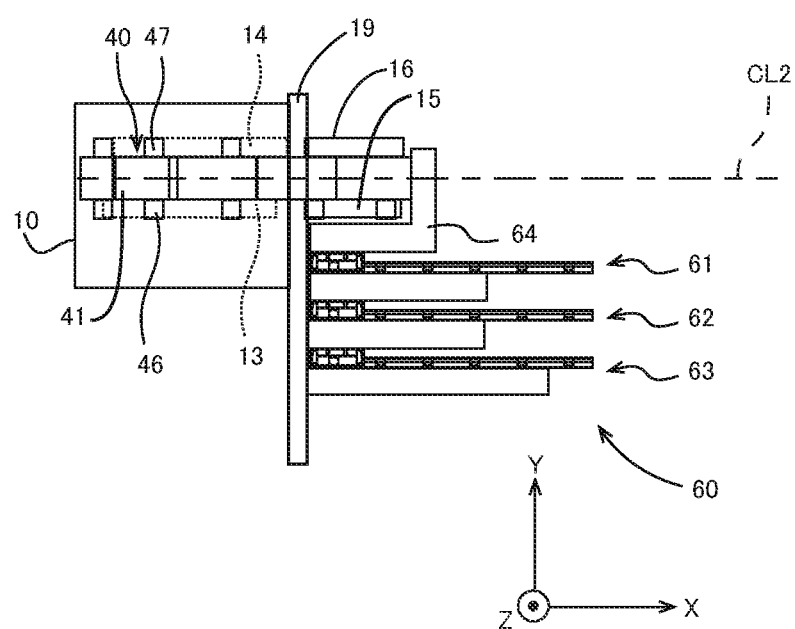
FIG. 20 is a plan view showing a linear expansion mechanism including a plurality of linear-motion guide mechanisms cascaded to each other instead of a telescopic structure.
Figure 21:
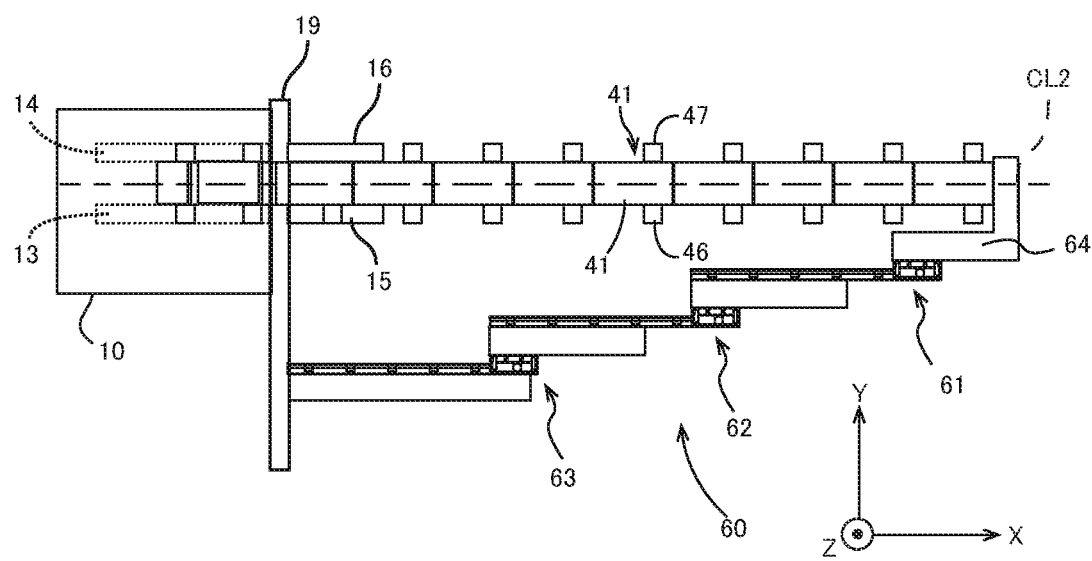
FIG. 21 is a plan view of the linear expansion mechanism in FIG. 20 in an expanded state.

The arm unit 20 according to this embodiment is not limited to the telescopic structure. For example, as shown in FIGS. 20 and 21, an arm unit 60 may be constituted by a plurality of linear-motion guide mechanisms 61, 62 and 63 cascaded to each other. Of the plurality of linear-motion guide mechanisms 61, 62 and 63, the linear-motion guide mechanisms 63 at the trailing end is fixed in a horizontal position to the lid plate 19 at a base thereof supporting a rail thereof, and the linear-motion guide mechanism 61 at the leading end is connected to the block 40 at the leading end of the block train 30 by an L-shaped connector 64 at a slider thereof. As the block train 30 moves back and forth along the axis of movement CL2, the arm unit 60 expands and contracts. The linear expansion mechanism having the arm unit 60 having a different structure, more specifically, constituted by the plurality of linear-motion guide mechanisms 61, 62 and 63, has the same advantages as the linear expansion mechanism 1 having the arm unit 20 having a telescopic structure.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A linear expansion mechanism, comprising:
a plurality of linear-motion mechanisms assembled in series to each other;
a block train including a plurality of blocks coupled to each other in a row, a block at a leading end of the plurality of blocks being connected to a linear-motion mechanism at a leading end of the plurality of linear-motion mechanisms; and
a housing part that houses the block train, the housing part being connected to a linear-motion mechanism at a trailing end of the plurality of linear-motion mechanisms,
wherein the housing part has a pair of arc-shaped rails that allow the block train to move in an arc-shaped trajectory, the arc-shaped rails being separately arranged on opposite sides of the block train,
the block train including the plurality of blocks coupled to each other in the row does not engage with another block train, and
a pair of projection bodies to be engaged with the pair of arc-shaped rails are provided on opposite side faces of each of the blocks in the row.

2. The linear expansion mechanism according to claim 1, wherein the pair of arc-shaped rails includes an inner rail that defines a trajectory of the projection body in the housing part from inside and an outer rail that defines the trajectory of the projection body in the housing part from outside.

3. The linear expansion mechanism according to claim 1, wherein the projection body is provided on the block at a position where, in a side view of the projection body, a center axis of the projection body along a projecting direction thereof is located on a circle that is concentric with the arc-shaped rails along with rotating shafts that couple the blocks to each other in the housing part.

4. The linear expansion mechanism according to claim 1, wherein the blocks are coupled to each other in such a manner that adjacent blocks abut against each other at front and rear end faces thereof and thereby are prevented from rotating in a forward direction but allowed to rotate in a backward direction in a state where the block train is straightened.

5. The linear expansion mechanism according to claim 1, wherein the part of the block train housed in the housing part extends over at least a half of the arc-shaped trajectory in a state where the plurality of linear-motion mechanisms expands to a maximum.

6. The linear expansion mechanism according to claim 1, wherein each of the pair of arc-shaped rails is provided with a straight rail as an extension.

7. The linear expansion mechanism according to claim 6, wherein the straight rails are provided with a pair of auxiliary rails that gradually separate from each other as they go forward in side view in order to facilitate entrance and exit of the block train.

8. A linear expansion mechanism, comprising:
a plurality of linear-motion mechanisms assembled in series to each other;
a block train including a plurality of blocks coupled to each other in a row, a block at a leading end of the plurality of blocks being connected to a linear-motion mechanism at a leading end of the plurality of linear-motion mechanisms; and a housing part that houses the block train, the housing part being connected to a linear-motion mechanism at a trailing end of the plurality of linear-motion mechanisms, wherein the housing part has a pair of arc-shaped rails that allow the block train to move in an arc-shaped trajectory, the arc-shaped rails being separately arranged on opposite sides of the block train, and a pair of projection bodies to be engaged with the pair of arc-shaped rails are provided on opposite side faces of each of the blocks, wherein, of the plurality of blocks constituting the block train, at least one block has two projection bodies on each side face thereof, and the other blocks have one projection body on each side face thereof.

9. A linear expansion mechanism, comprising:

a plurality of linear-motion mechanisms assembled in series to each other;

a block train including a plurality of blocks coupled to each other in a row, a block at a leading end of the plurality of blocks being connected to a linear-motion mechanism at a leading end of the plurality of linear-motion mechanisms; and a housing part that houses the block train, the housing part being connected to a linear-motion mechanism at a trailing end of the plurality of linear-motion mechanisms, wherein the housing part has a pair of arc-shaped rails that allow the block train to move in an arc-shaped trajectory, the arc-shaped rails being separately arranged on opposite sides of the block train, and a pair of projection bodies to be engaged with the pair of arc-shaped rails are provided on opposite side faces of each of the blocks, wherein, of the plurality of blocks constituting the block train, a block at a trailing end of the block train has two projection bodies on each side face thereof, and the other blocks have one projection body on each side face thereof.

* * * * *